Sept. 3, 1957  A. L. CHELINI  2,804,870
AIR FURNACE HUMIDIFIER SYSTEM
Filed Feb. 8, 1955
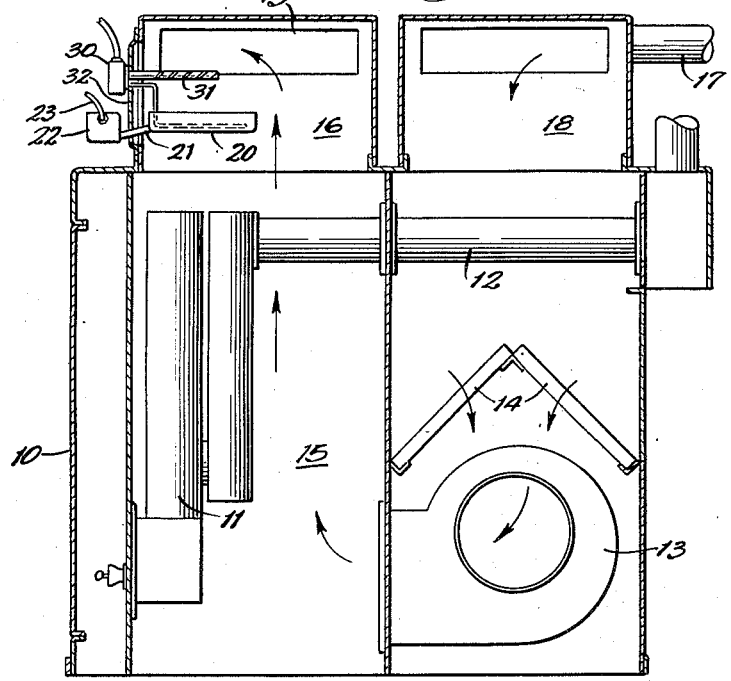
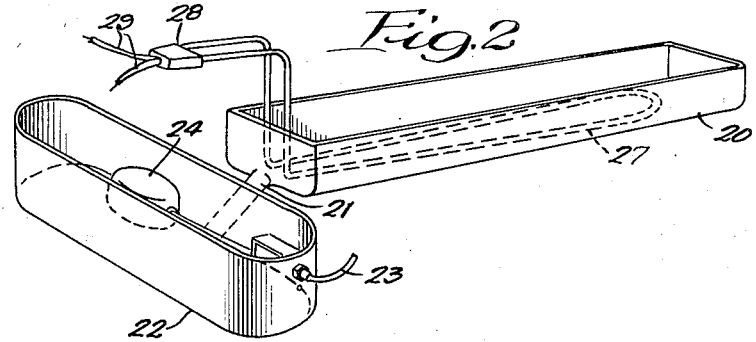
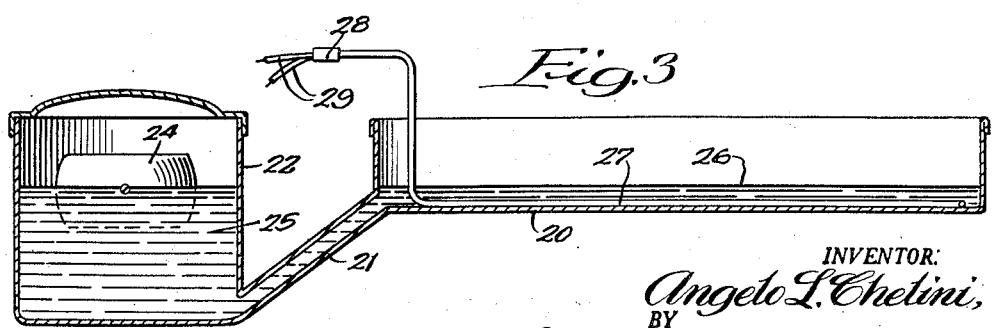
INVENTOR:
Angelo L. Chelini,
BY
Dawson, Tilton & Graham,
ATTORNEYS.

United States Patent Office 2,804,870
Patented Sept. 3, 1957

2,804,870

AIR FURNACE HUMIDIFIER SYSTEM

Angelo L. Chelini, Evanston, Ill., assignor to Humidy Booster Co., a corporation of Illinois Application February 8, 1955, Serial No. 486,910

1 Claim. (Cl. 126—113)

This invention relates to an air furnace humidifier system, and is particularly useful in the supplying of water vapor within the plenum chamber of a hot air furnace under conditions for maintaining a desired and uniform humidity.

In present practice, it is common to introduce an evaporator pan within a furnace adjacent the heating area for the vaporization of moisture. As evaporation continues under these conditions, it is found that a heavy lime or carbonate deposit forms within the evaporator pan, and a scum or blanket of the material forms over the body of water itself. The latter tends to prevent evaporation, and in most instances the heated air is starved and does not bear its proper amount of moisture. Particularly is this true where attempts are made to evaporate the water within the plenum chamber where temperatures ordinarily do not exceed 200° F. and where most effective humidification can take place.

An object of the present invention is to provide apparatus which is effective in overcoming the difficulties above described and in providing effective humidification of the air leaving the air space of a furnace, and particularly the plenum chamber. A further object is to provide means whereby, after certain temperature conditions have been attained in the plenum chamber, auxiliary means are provided for bringing about turbulence of the water in the evaporator pan so as to break the film thereon and bring about effective vaporization of the water. A still further object is to provide in an air heating furnace means whereby boiling of the water is effected after predetermined temperatures have been attained, while cutting off the auxiliary heating means after temperatures within the plenum chamber, etc. have dropped below a predetermined point. Other specific objects and advantages will appear as the specification proceeds.

The invention is shown, in an illustrative embodiment, by the accompanying drawing, in which—

Figure 1 is a vertical sectional view of apparatus embodying my invention; Fig. 2, a broken perspective view of the humidifier apparatus employed; and Fig. 3 an enlarged sectional view of the humidifier pan and float and the auxiliary heating means within the pan.

In the practice of my invention, any suitable air heating furnace may be employed. In the illustration given, a conventional type furnace is shown, having a casing 10 and a heating unit 11 therein provided with an exhaust or smoke pipe 12. A blower 13 draws air through the filters 14 and discharges them into the air chamber 15, which terminates within the plenum chamber 16. The furnace is provided with the usual return pipes 17, which open into a return header or chamber 18. Since the foregoing structure is well known, a further detailed description herein is believed unnecessary.

In the plenum chamber 16, which may be provided with a plurality of outlet pipes 19, I support a humidifier pan 20 which is connected through inclined tube 21 to a water tank or reservoir 22. The tank 22 is provided with an inlet tube 23, and the inlet valve is controlled by the usual float 24. The level of water 25 within the tank 22 is maintained at such a height as to provide a water level 26 within pan 20, as shown more clearly in Fig. 3.

In the practice of my invention, I place in the bottom of the pan 20 an electric resistance element 27 which forms a loop therein and the ends of the resistance element are received within an insulating plug 28, current being supplied through the plug 28 by electric leads which extend from the plug 28 through the cord 29. The flow of current to the resistance element 27 is controlled by a switch in the control mechanism 30 which is equipped with a thermostatic coil device 31 of the usual construction employed in furnaces for controlling the action of the blower fan. Since the temperature-responsive control mechanism 30 is of well-known construction, a detailed description herein is believed unnecessary. It is sufficient to state that the control mechanism is so set as to throw the switch for closing the circuit leading to the resistance element 27 when the temperature within the plenum chamber reaches a predetermined point, say, for example, 150° F. Similarly, the control element is so set as to provide for opening the switch to the circuit of the resistance element when the temperature within the plenum chamber falls below a predetermined temperature, say, 125° F.

The resistance element 27 may be of any suitable construction, such as, for example, metal forming a resistance and encased within a stainless steel sheath or a copper sheath, etc. I prefer to employ a stainless steel sheath because of the better action of this material over substantial periods of time.

*Operation*

In the operation of the apparatus, the furnace 11 is started, employing gas or oil firing means, etc., and the air space 15 becomes filled with heated air which rises to the plenum chamber 16. After the temperature in the plenum chamber has reached a certain point, say, for example, 110° F., the control element 30 sets the blower 13 in operation and air is passed by the blower through the heating chamber 15 and into the plenum chamber 16. In this operation, the temperature of the air continues to rise and when this temperature reaches 150° F., or some selected temperature, the temperature-responsive element 31 actuates the control mechanism 30, which in turn closes the circuit leading to the electric resistance element 27. The water body which has already been heated to a substantial extent by the flow of air, is quickly raised by the resistance element 27 to a boiling temperature, and the ensuing turbulence breaks the film or blanket of material on the face of the water 26, allowing effective vaporization to take place. Further, the turbulence of the water is effective in maintaining the passage 21 clear at all times so that water flows freely from the tank 22 into the vaporizing pan 20. After the heating unit has been cut off and the temperature within the plenum chamber drops to a temperature around 125° F., or so, the circuit leading to the resistance element 27 is opened by the action of the temperature-responsive control 30, vaporization is sharply reduced, and at this stage the film on the surface of the water, should this form, is effective in reducing the vaporization, since vaporization at the stage of dropping temperatures is less desirable.

It will be understood that the mechanism herein described may be employed not only in new heater combinations, but may be employed in existing humidifiers. For example, the control mechanism and resistance element herein shown may be employed with humidifier pans already existing in furnaces.

In the structure shown, the front panel 32 may be made removable, or a section thereof may be made removable, so that the pan 20 may be readily removed for examination or repair, etc.

While, in the foregoing specification, I have set forth a specific structure in considerable detail for the purpose of illustrating an embodiment of the invention, it will be understood that such details of structure may be varied widely by those skilled in the art without departing from the spirit of my invention as defined by the following claim.

I claim:

In combination with a hot air furnace equipped with a plenum chamber and means for forcing heated air through said plenum chamber, a vaporizing pan supported within said plenum chamber with side and bottom portions thereof exposed to the flow of the heated air, said pan being open at its top and adapted to receive water therein for vaporizing the same, float control means for supplying water to said pan, means for agitating the water within said pan comprising an electric resistance element extending into said pan and adapted to be immersed when water is supplied to the pan, circuit means for supplying electric current to said resistance element to bring the temperature of the water therein to boiling, a switch controlling the flow of current to said resistance element, and temperature-responsive switch-operating means mounted to extend into the chamber for closing said switch when the temperature within said plenum chamber reaches an elevated predetermined point and for opening said switch when the temperature within the plenum chamber falls below a predetermined point.

References Cited in the file of this patent

UNITED STATES PATENTS

| | | |
|---|---|---|
| 1,674,337 | Klees | June 19, 1928 |
| 1,713,193 | Roemer | May 14, 1929 |
| 1,812,131 | Bock | June 30, 1931 |
| 1,853,421 | Harris | Apr. 12, 1932 |
| 1,866,221 | Pennington | July 5, 1932 |
| 1,926,462 | Stark | Sept. 12, 1933 |
| 2,031,220 | Lehn | Feb. 18, 1936 |